United States Patent [19]
Kudo

[11] Patent Number: 4,653,044
[45] Date of Patent: Mar. 24, 1987

[54] DATA COMMUNICATING METHOD WITH CAPABILITY OF FULL-DUPLEX COMMUNICATION OVER TWO-WIRE CIRCUIT

[75] Inventor: Shozo Kudo, Yokohama, Japan

[73] Assignee: Ricoh Company, Ltd., Tokyo, Japan

[21] Appl. No.: 727,428

[22] Filed: Apr. 26, 1985

[30] Foreign Application Priority Data

May 2, 1984 [JP] Japan .................................. 59-87850

[51] Int. Cl.⁴ ............................................. H04L 5/14
[52] U.S. Cl. ......................................... 370/29; 370/31
[58] Field of Search ............................ 370/31, 29, 24

[56] References Cited

U.S. PATENT DOCUMENTS 3,956,589  5/1976  Weathers et al. ..................... 370/31
4,288,868  9/1981  Grotjohann et al. ................. 370/31

Primary Examiner—Douglas W. Olms
Assistant Examiner—M. Huseman
Attorney, Agent, or Firm—Oblon, Fisher, Spivak, McClelland & Maier

[57] ABSTRACT

A communicating method for a data communications apparatus capable of transmitting data in a full-duplex mode over a two-wire circuit. Prior to the transmission of data, a transmit and a receive terminals exchange training signals to test circuit conditions in order to see if full-duplex communication therebetween is allowable. Depending upon the result of the test, either a full-duplex mode or a semiduplex mode is set up for data communication.

6 Claims, 3 Drawing Figures

DATA COMMUNICATING METHOD WITH CAPABILITY OF FULL-DUPLEX COMMUNICATION OVER TWO-WIRE CIRCUIT

BACKGROUND OF THE INVENTION

The present invention relates to a communicating method for a data communications apparatus which is capable of performing full-duplex communication over a two-wire circuit.

As well known in the art, communications systems may generally be classified into two types, i.e., a full duplex communications type which allows data to be transmitted simultaneously in both directions, and a semiduplex communications type which allows data transmission to occur simultaneously in one direction. Usually, a full-duplex communications type system is implemented by a four-wire circuit because it requires two data transmission channels, while a semiduplex communications type system require is implemented by a two-wire circuit because it needs only a single data transmission channel. Hence, once a particular kind of circuit is laid at the stage of installation of terminal units, the communications system cannot be changed any longer. It is true that a transmission system has been put to practical use which frequency division multiplexes the transmission band into a data transmision channel (forward channel) and a control signal transmission channel (backward channel) and, using a two-wire circuit, allows one terminal to transmit control signals representative of data receipt conditions and others to the the other terminal while the latter is transmitting data, or information, to the former. Yet, this kind of transmission system cannot be regarded as a perfect implementation for full-duplex communication.

Meanwhile, with the advent of advanced echo cancelling techniques, there has recently been realized a modem capable of securing two independent data transmission channels by the use of a two-wire circuit, e.g. a modem prescribed by CCITT (Consultive Committee of International Telegraph and Telephone) Recommendation V.26 ter. A modem with such a capability has broken new ground for full-duplex communication using a two-wire circuit. Outstanding advantages attainable with full-duplex communication over a two-wire circuit are remarkable cost-cutting and enhancement of transmission efficiency.

However, if full-duplex communication is performed between remote stations under poor circuit conditions due to deterioration of circuit characteristics, data cannot be exchanged in an adequate manner and the transmission is simply wasted. In addition, where the communication mode set up is the full-duplex mode, it is impossible to replace it with a semiduplex mode and, so, data cannot be transmitted until the circuit conditions are restored to normal.

SUMMARY OF THE INVENTION

It is therefore an object of the present invention to eliminate the drawbacks particular to the prior art communications systems as discussed above.

It is another object of the present invention to provide a communicating method for a data communications apparatus which determines whether communication in a full-duplex mode is allowable by testing circuit conditions prior to transmission of data and, depending upon the results of the test, sets up a particular communication mode for data transmission.

It is another object of the present invention to provide a generally improved data communicating method with a capability of full-duplex communication over a two-wire circuit.

A method of communicating data of the present invention is applicable to a data communication apparatus which includes a modem selectively operable in a full-duplex communication mode and a semiduplex communication mode over a two-wire circuit. The method comprises the steps of executing training in the full-duplex communication mode between a transmit terminal and a receive terminal within a first predetermined period, causing each of the transmit and receive terminals to transmit, within a second predetermined period which follows the first predetermined period, a result of the training determined at the terminal to the other terminal in the semiduplex communication mode, and setting up either one of the full-duplex and semiduplex communication modes in response to results of the training and at the end of the second predetermined period.

In accordance with the present invention, a communicating method for a data communications apparatus capable of transmitting data in a full-duplex mode over a two-wire circuit is disclosed. Prior to the transmission of data, a transmit and a receive terminals exchange training signals to test circuit conditions in order to see if full-duplex communication therebetween is allowable. Depending upon the result of the test, either a full-duplex mode or a semiduplex mode is set up for data communication.

The above and other objects, features and advantages of the present invention will become apparent from the following detailed description taken with the accompanying drawings.

DESCRIPTION OF THE PREFERRED EMBODIMENT

While the data communicating method with a capability of full-duplex communication over a two-wire circuit of the present invention is susceptible of numerous physical embodiments, depending upon the environment and requirements of use, a substantial number of the herein shown and described embodiment have been made, tested and used, and all have performed in an eminently satisfactory manner.

Figure 1:
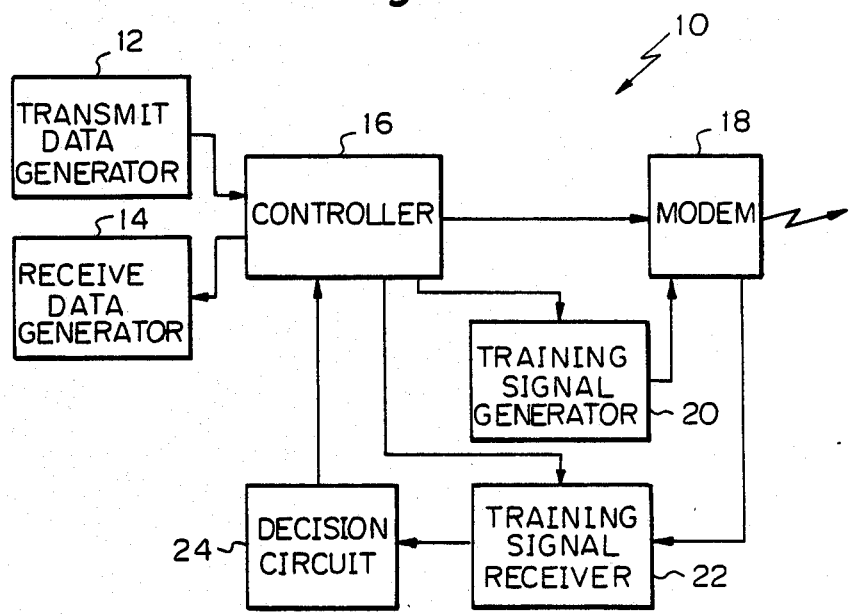
FIG. 1 is a block diagram of a data communications apparatus with which the method of the present invention may be practiced.

Referring to FIG. 1 of the drawings, a data communications apparatus for practicing the method of the present invention is shown and generally designated by the reference numeral 10. The apparatus 10 includes a transmit data generator 12 for generating data to be transmitted, and a received data processor 14 for processing received data. A controller 16 functions to execute a data link control assigned to the data communications apparatus as well as controls over various sections of the apparatus. A modem 18 is capable of modulating and demodulating data either in a full-duplex communication mode or in a semiduplex communication mode. A training signal generator 20 is adapted to generate a training signal in a full-duplex communication mode, while a training signal receiver 22 is adapted to receive a training signal in a full-duplex communication mode. Further, a decision circuit 24 serves to decide whether circuit conditions have been deteriorated too much to effect full-duplex communication depending upon the result of receipt at the training signal receiver 22. The controller 16 is selectively operable in a full-duplex communication mode and a semiduplex communication mode. The training signal may be provided with a format such as prescribed by CCITT Recommendation V.29, for example.

Assume that data are transmitted from a transmit terminal, or apparatus, TX to a receive terminal, or apparatus, RX each having the illustrative construction shown in FIG. 1. First, the transmit terminal TX originates a call meant for the receive terminal RX to set up a circuit therebetween. Then, for a predetermined period $T_1$, training signals are exchanged between the transmit and receive terminals TX and RX in a full-duplex mode and then, for the next period $T_2$, results of the training are exchanged in a semiduplex mode, which is highly reliable.

Figure 2A:
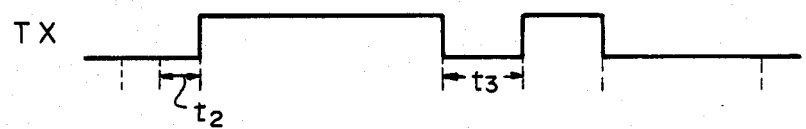
FIGS. 2A and 2B are timing charts representative of exchange of training signals and mode setting information performed between remote terminals each having the construction shown in FIG. 1.
Figure 2B:
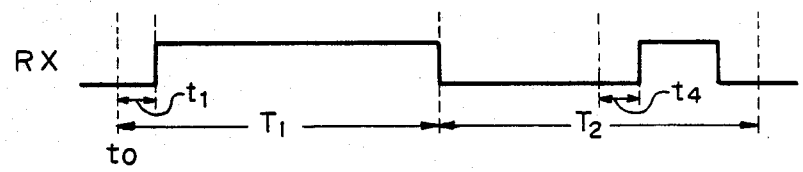

Specifically, as shown in FIGS. 2A and 2B, as a time $t_1$ expires from a time $t_o$ at which the circuit has been set up, the controller 16 of the receive terminal RX conditions the modem 18 for a full-duplex mode and activates the training signal generator 20 to send a training signal to the transmit terminal TX. The transmit terminal TX, upon detection of a carrier of the incoming training signal, conditions its modem 18 for a full-duplex mode upon the lapse of a time $t_2$ after the carrier detection. At the same time, the transmit terminal TX activates its training signal generator 20 to send a training signal to the receive terminal TX. The demodulated output of the modem 18 is applied to the training signal receiver 22 whereupon a result of the receipt is applied from the receiver 22 to the decision circuit 24. At the receive terminal RX, a demodulated output of the modem 18 associated with the training signal from the transmit terminal TX is fed to the training signal receiver 22 the output of which is applied to the decision circuit 24.

As the period $T_1$ elapses, the controller 16 at each of the transmit and receive terminals TX and RX is supplied with an output of the decision circuit 24 while switching the operation mode of the modem 18 to a semiduplex mode. Upon the lapse of a time $t_3$ since the end of the period $T_1$, the controller 16 of the transmit terminal TX sends to the receive station RX mode setting information in response to the result of decision output from the decision circuit 24. The controller 16 of the receive station RX, upon the lapse of a time $T_4$ since the receipt of the mode setting information, transmits to the transmit station TX mode setting information based on an output of the decision circuit 24. At the end of the period $T_2$, each of the transmit and receive terminals TX and RX sets in its modem 18 a full-duplex mode if the mode setting information from both the terminals represent a full-duplex mode and a semiduplex mode if otherwise. Thereafter, both the transmit and receive terminals TX and RX enter into a predetermined data link control procedure in order to effect transmission of desired data.

It will be noted that the training adapted for determination of circuit conditions may be included in the data link control procedure. Also, if any of the transmit and receive terminals TX and RX has failed to receive a result of training, the same traning sequence may be repeated again after the period $T_2$.

The specific construction shown and described is applicable to various data transmission apparatuses such as a facsimile apparatus and a teletex apparatus.

In summary, it will be seen that the present invention provides a data communicating method which optimumly matches the data transmission mode to actual conditions of a two-wire circuit by determining whether full-duplex communication is allowable over the two-wire circuit through exchange of training signals and, based on a result of the decision, selectively setting up a full-duplex mode or a semiduplex mode.

Various modifications will become possible for those skilled in the art after receiving the teachings of the present disclosure without departing from the scope thereof.

What is claimed is:

1. A method of communicating data for a data communication apparatus which includes modem means selectively operable in a full-duplex communication mode and a semiduplex communication mode over a two-wire circuit, said method comprising the steps of:
    (a) causing a transmit terminal to originate a call meant for a receive terminal to set up a circuit therebetween;
    (b) executing training in the full-duplex communication mode between the transmit terminal and the receive terminal within a first predetermined period by causing the transmit terminal to transmit a training signal to the receive terminal within the first predetermined period, and causing the receive terminal to transmit a training signal to the transmit terminal within a second predetermined period;
    (c) causing each of the transmit and receive terminals to transmit, within the second predetermined period which follows the first predetermined period, a result of the training determined at said terminal to the other terminal in the semiduplex communication mode; and
    (d) setting up either one of the full-duplex and semiduplex communication modes in response to results of the training and at the end of the second predetermined period.

2. A method as claimed in claim 1, wherein step (b) comprises (g) conditioning the modem means of the receive terminal for the full-duplex communication mode and causing the receive terminal to transmit the training signal to the transmit terminal, each upon the lapse of a first predetermined time after the circuit is set up.

3. A method as claimed in claim 2, wherein step (b) comprises (h) conditioning the modem means of the transmit terminal for the full-duplex communication mode and causing the transmit terminal to transmit the training signal to the receive terminal, each upon the lapse of a second predetermined time after the transmit terminal receives the training signal from the receive station.

4. A method as claimed in claim 1, wherein step (b) further comprises (g) determining a circuit condition in response to a condition of the training signal received by the receive terminal, and (h) determining a circuit condition in response to a condition of the training signal received by the transmit terminal.

5. A method as claimed in claim 4, wherein step (c) comprises (i) conditioning the modems of the transmit and receive terminals each for the semiduplex communication mode at the end of the first predetermined period, (j) causing the transmit terminal to transmit to the receive terminal transmit terminal mode setting information in response to the determined circuit condition upon the lapse of a third predetermined time after the beginning of the second predetermined period, and (k) causing the receive terminal to transmit to the transmit terminal receive terminal mode setting information in response to the determined circuit condition upon the lapse of a fourth predetermined time after the receipt of the transmit terminal mode setting information at step (j).

6. A method as claimed in claim 5, wherein said (d) comprises (l) setting up the full-duplex communication mode if both the transmit terminal and receive terminal mode setting information represent the full-duplex communication mode and the semiduplex communication mode if otherwise.

* * * * *